United States Patent [19]

Hemmerich et al.

[11] Patent Number: 4,927,066
[45] Date of Patent: May 22, 1990

[54] GAS AND OIL TRUCK TANK MOUNTING STRAP REPLACEMENT KIT

[76] Inventors: Louis Hemmerich, 62-69 60th Rd., Maspth, N.Y. 11378; Ronald Strait, 80-15 30th Ave., Apt. 1, Jackson Heights, N.Y. 11370

[21] Appl. No.: 278,756

[22] Filed: Dec. 2, 1988

[51] Int. Cl.$^5$ .................... B60P 3/22; B65D 88/12
[52] U.S. Cl. ..................... 224/42.45 R; 410/47; 105/362
[58] Field of Search ............... 220/1 B, 855; 206/223; 296/35.3 X; 224/273, 42.41, 42.45 R, 42.46 R; 410/156, 47, 49; 105/358, 362; 280/833, 834

[56] References Cited

U.S. PATENT DOCUMENTS

| 1,274,200 | 7/1918 | Rodman et al. | 105/362 |
| 1,704,662 | 3/1929 | Flannery | 105/362 |
| 2,595,835 | 5/1952 | Folmsbee | 105/362 |
| 2,792,231 | 5/1957 | Compton | 105/362 X |

FOREIGN PATENT DOCUMENTS

| 340047 | 4/1936 | Italy | 105/362 |
| 0022547 | 2/1980 | Japan | 410/47 |
| 0022548 | 2/1980 | Japan | 410/47 |
| 80591 | 1/1956 | Netherlands | 105/362 |

Primary Examiner—Ernest G. Cusick
Attorney, Agent, or Firm—Richard L. Miller

[57] ABSTRACT

This kit is designed to be a replacement for gasoline and oil truck tank mounting straps. Primarily, it consists of a multiple number of assemblies, each including a pair of mounting plates, a vertical plate, a threaded rod, a horizontal mounting plate, and a horizontal bottom support strap plate, which is tightened up against the bottom of the frame of the body of a truck by nuts so as to allow quick replacement of a tank on such a vehicle.

7 Claims, 1 Drawing Sheet

GAS AND OIL TRUCK TANK MOUNTING STRAP REPLACEMENT KIT

BACKGROUND OF THE INVENTION

The instant invention relates generally to mounting devices for vehicles, and more particularly, to a gas and oil truck tank mounting straps replacement kit.

Numerous mounting devices have been provided in the prior art that are adapted to automotive vehicles. While these units may be suitable for the particular purpose to which they address, they would not be as suitable for the purpose of the present invention as hereafter described.

At the present state of the art gas and oil tank trucks all have their tank strap permanently welded to the tank of the vehicle employed to transport these volatile and explosive materials. Unfortunately, most of these tanks eventuality require periodic maintenance which requires that the tank be removed from the chassis. At present, this requires that a tank be degassed then unwelded from the chassis, a procedure which is quite time consuming and very hazardous if not properly executed. It is a mechanism for the quick and easy removal and replacement of this tank that the instant invention achieves. This allows a vehicle to be out of service for only a minimum of time because a substitute tank can be quickly reinstalled on the vehicle while the removed tank can be degassed after removal.

SUMMARY OF THE INVENTION

A primary object of the present invention is to provide a gas and oil truck tank mounting strap replacement kit that will overcome the shortcomings of the prior art devices.

Another object is to provide a gas and oil truck mounting strap replacement kit, which will avoid degassing plus welding new mounting elements.

An additional object is to provide a gas and oil truck mounting strap replacement kit which will save a considerable amount of time as compared with the prior art, where the tanks had to be placed in a safe condition to prevent explosion due to volatile fumes present that had be removed.

A further object is to provide a gas and oil truck tank mounting strap replacement kit that is simple and easy to use.

A still further object is to provide automotive vehicles that are economical in cost to manufacture. Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
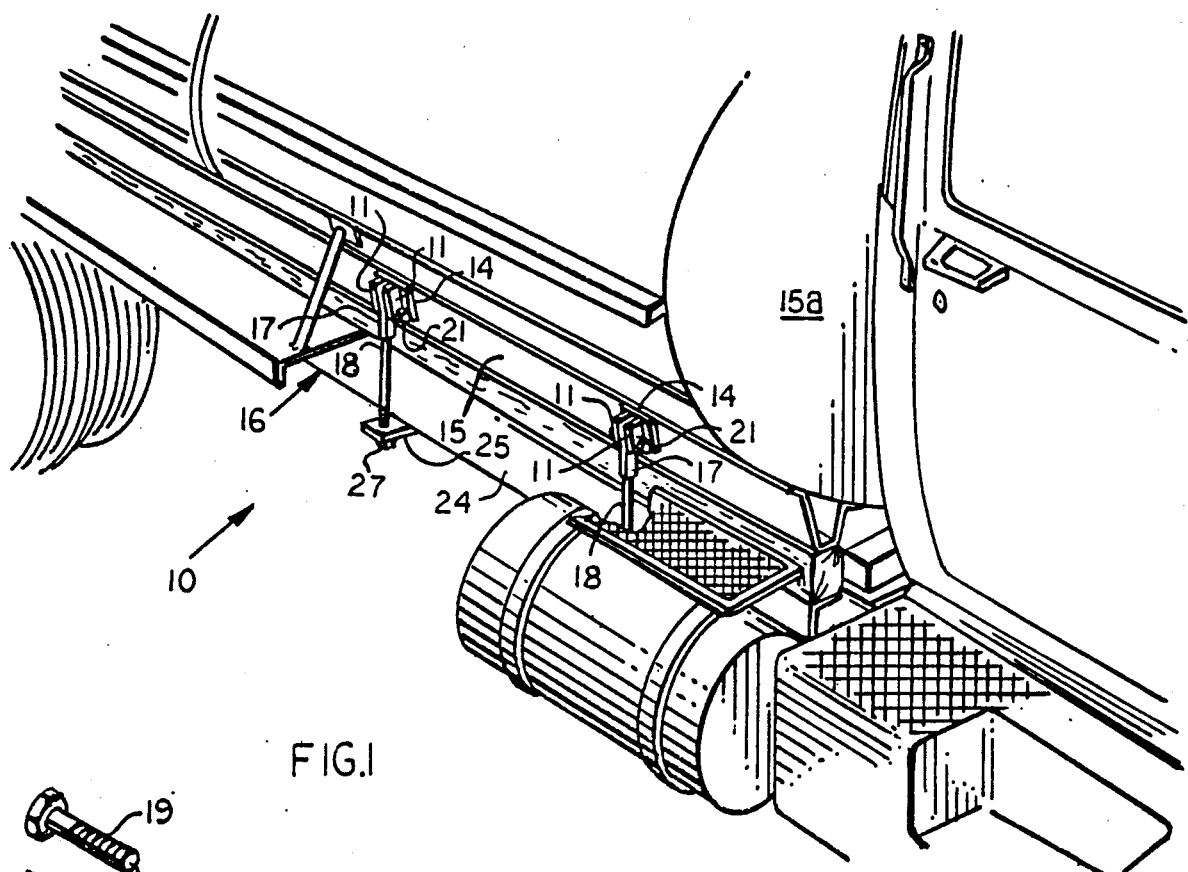
FIG. 1 is a fragmentary perspective view of a tank truck incorporating the present invention.
Figure 2:
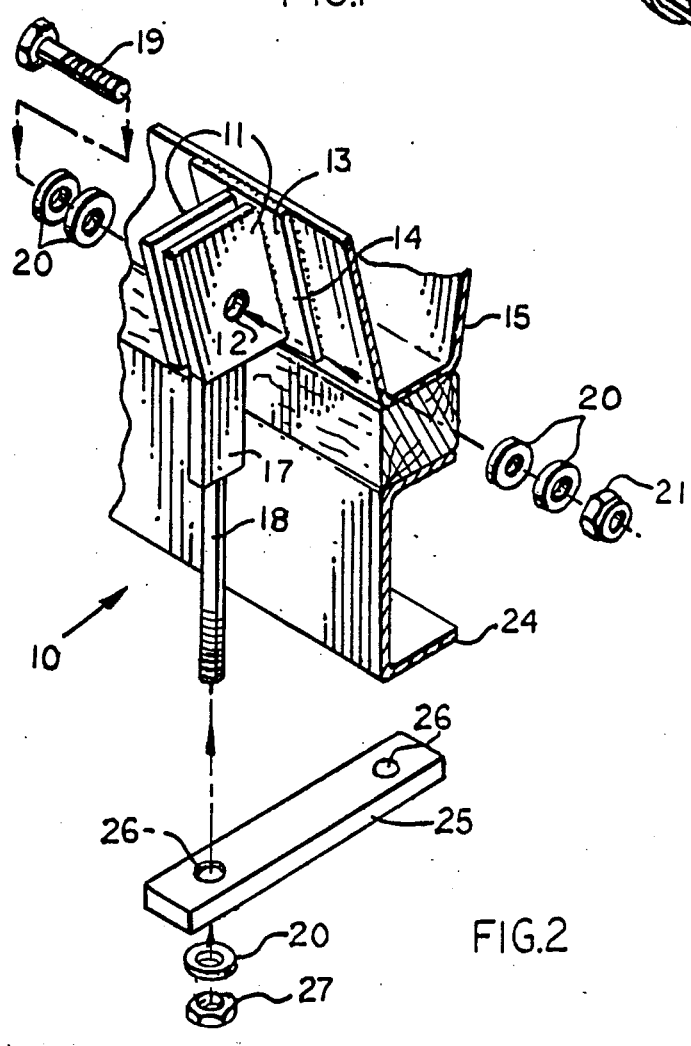
FIG. 2 is an enlarged isometric view of the invention with the hardware exploded therefrom.
Figure 3:
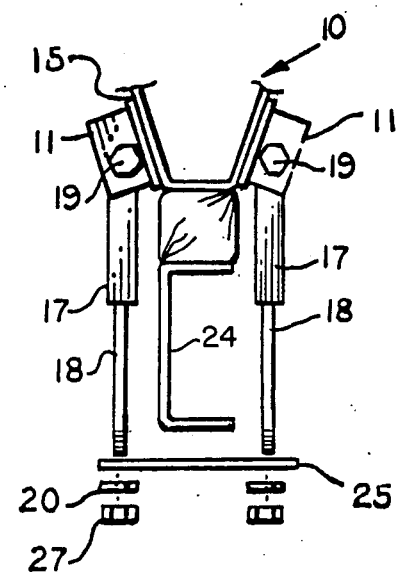
FIG. 3 is a vertical cross-sectional view of FIG. 2, shown in elevation

Turning now descriptively to the drawings, in which like reference characters denote like elements throughout the several views, FIG. 1 illustrates a mounting strap replacement kit 10, which is shown to include a complement of a pair of rectangular mounting plates 11 having an opening 12 therethrough. Mounting plates 11 are welded spaced-apart at one longitudinal side edge, to a pace 13 of a plate 14, also welded to a tank bearing side channel 15 of a tank structure attached to the underside of tank 15a on truck chassis 16 thereby providing hold down means. A second elongated rectangular vertical plate 17 is provided, to which a threaded rod 18 is welded to at one end, and an opening (not shown) is also provided through an end portion of vertical plate 17, so as to form essentially an eye bolt of great strength. A bolt 19 is received through a pair of washers 20 and is received through openings 12 of mounting plates 11 and the opening through the vertical plate 17. The threaded end of bolt 19 receives a second pair of washers 20 and a lock nut 21, and the rod 18 of vertical plate 17 is received through one of a pair of openings 26 provided through respective opposite end portions of a horizontal rectangular strap plate 25 with that receives rod 18.

It shall be noted, that the assemblies of plates 11, 17, 25 and rods 18, are provided on both sides of channel 15 and the other rod 18 is received through the second opening 26 of strap plate 25. A washer 20 is also received on rods 18, and a lock nut 27 is received thereon. The kit 10 is suggested to consist of sixteen of the assemblies of plates 11, 17, and 25 with their respective fastener means.

In use, the plates 11 are welded to plates 14 that are welded to channel 15 on each side of the tank 15a providing a plurality of hold down means, and bolt fasteners 19 are passed through openings 12 and the openings through plates 17, and are held secure by the nut fasteners 21. The rods 18 are received through openings 26 of plates 25, and nut fasteners 27 are received on rods 18 and hold plates 25 secure against the bottom surfaces of the frame 24.

When it is desired to remove the tank 15a from the frame 24 of truck chassis 16 all nuts 27 are first loosened, then all bolts 19 are removed from openings 12 of all assemblies of plates 11 and 17. This allows the entire tank per se to be lifted away from the truck body and have bottom surfaces of channels 15 available to be set on a flat surface. Although a bolt 19 is illustrated as the coupling member for between the plate 17 and plates 11 it should be understood that numerous other pin shaped device will suffice.

While certain novel features of this invention have been shown and described and are pointed out in the annexed claims, it will be understood that various omissions, device illustrated and in its operation can be made by those skilled in the art without departing from the spirit of the invention.

What is claimed is:

1. A gas and oil truck tank structure mounting strap replacement kit, comprising, a plurality of assemblies, each assembly including a pair of parallel mounting plates adapted for mounting to tank bearing channels of a tank structure when carried on a frame of a truck, a vertical plate adapted to be releasably attached to said pair of mounting plates, a rod adapted to be received by the vertical plate, and a horizontal strap plate adapted to be received on said rod and adapted for securing to the frame, for securing said tank structure to a truck vehicle.

2. A gas and oil truck tank structure mounting strap replacement kit as set forth in claim 1 wherein a further plate is fixedly secured to one side of one channel secured to said tank, mounting plates of one of said pairs of mounting plates are welded spaced-apart to said further plate, aligned openings are provided through said mounting plates and an additional opening is provided through vertical said plate, and said vertical plate is disposed between said pair of mounting plates with all said openings in alignment, and a bolt fastener is received through all said openings and a lock nut fastener is received on said bolt fastener.

3. A gas and oil truck tank mounting strap replacement kit as set forth in claim 2, wherein said rod is threaded on one end with an opposite end is fixedly secured to an end of said vertical plate that extends from below said mounting plates a further opening is provided through said horizontal strap plate and said threaded end of said rod is freely received in said further opening.

4. A gas and oil truck tank structure mounting strap replacement kit as set forth in claim 3 wherein said further opening extends through one end portion of said strap plate and said threaded end of said rod receives a second lock nut fastener, and said strap plate engages with a bottom surface of said frame.

5. A gas and oil truck tank structure mounting strap replacement kit as set forth in claim 4, wherein a second further openings extends through another end portion of said strap plate, and receives a threaded end of a second rod of a second assembly comprising a pair of said mounting plates, a vertical plate, and said another end portion is held upward by a nut fastener received on said second rod.

6. A gas and oil truck tank structure mounting strap replacement device for securing the tank structure to a frame of the truck, comprising:
 (a) a plurality of hold down means comprising a plurality of plates welded directly to a tank structure;
 (b) a plurality of eye bolts fabricated from plates having holes therein and thread rods secured thereto cooperating with said plurality of hold down means;
 (c) means coupling said plurality of eye bolts to said plurality of hold down means; and
 (d) means securing said plurality of eye bolts to a frame of a truck.

7. A gas and oil truck tank structure mounting strap replacement device as set forth in claim 6, wherein said means coupling said plurality of eye bolts to said plurality of hold down means is a threaded bolt and mating nut.

* * * * *